United States Patent
Vergnet et al.

(10) Patent No.: US 11,186,380 B2
(45) Date of Patent: Nov. 30, 2021

(54) ENERGY MANAGEMENT SYSTEM FOR MINIMUM FUEL CELL LOAD, AIRCRAFT HAVING AN ENERGY MANAGEMENT SYSTEM AND METHOD FOR ENSURING MINIMUM FUEL CELL LOAD

(71) Applicants: Airbus Defence and Space GmbH, Taufkirchen (DE); Airbus Operations GmbH, Hamburg (DE)

(72) Inventors: Dominique Vergnet, Toulouse (FR); Barnaby Law, Hamburg (DE); Winfried Lohmiller, Taufkirchen (DE)

(73) Assignees: AIRBUS DEFENCE AND SPACE GMBH, Taufkirchen (DE); AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 16/864,277

(22) Filed: May 1, 2020

(65) Prior Publication Data
US 2020/0346776 A1    Nov. 5, 2020

(30) Foreign Application Priority Data
May 2, 2019    (EP) .................................... 19315029

(51) Int. Cl.
*B64D 31/00*    (2006.01)
*H01M 8/04858*    (2016.01)
(Continued)

(52) U.S. Cl.
CPC ........ *B64D 31/00* (2013.01); *H01M 8/04925* (2013.01); *H01M 16/003* (2013.01);
(Continued)

(58) Field of Classification Search
CPC .............. B64D 31/00; B64D 2221/00; H01M 8/04925; H01M 16/003; H01M 2250/20;
(Continued)

(56) References Cited

U.S. PATENT DOCUMENTS

2003/0230671 A1    12/2003  Dunn
2010/0009220 A1*   1/2010  Higdon ............... H01M 8/0494
                                                             429/431
(Continued)

FOREIGN PATENT DOCUMENTS

CA    2865710 A1 *  9/2013  ............. B64D 11/04
WO   2013136286 A2   9/2013
(Continued)

OTHER PUBLICATIONS

European Search Report; priority document.
European Office Action from corresponding European Patent Application No. 19315029.9 dated May 21, 2021.

*Primary Examiner* — Robert L Deberadinis
(74) *Attorney, Agent, or Firm* — Greer, Burns & Crain, Ltd.

(57) ABSTRACT

An energy management system for an aircraft, wherein the energy management system comprises a fuel cell configured to convert chemical energy into electric energy, at least one energy source configured to provide electric energy, at least one electrical load, an electric bus electrically coupled to the fuel cell, the at least one energy source, and the at least one electrical load, and a controller configured to control the at least one electrical load in such a manner that a minimum load to the fuel cell is ensured. Furthermore, an aircraft comprises such energy management system. A method for managing energy in a system comprises electrically coupling a fuel cell, at least one energy source, and at least one electrical load by an electric bus, and controlling at least one
(Continued)

electrical load in such a manner that a minimum load to the fuel cell is ensured.

14 Claims, 3 Drawing Sheets

(51) Int. Cl.
    *H01M 16/00*     (2006.01)
    *H02J 4/00*     (2006.01)

(52) U.S. Cl.
    CPC ............ *H02J 4/00* (2013.01); *B64D 2221/00* (2013.01); *H01M 2250/20* (2013.01); *H02J 2300/30* (2020.01); *H02J 2310/44* (2020.01)

(58) Field of Classification Search
    CPC .......... H01M 31/99; H01M 16/00; H02J 4/00; H02J 2310/44; H02J 2300/30
    See application file for complete search history.

(56) References Cited

U.S. PATENT DOCUMENTS

| | | |
|---|---|---|
| 2015/0028670 A1 | 1/2015 | Boodaghians et al. |
| 2015/0056477 A1 | 2/2015 | Ge |
| 2017/0263956 A1 | 9/2017 | Web et al. |
| 2018/0138716 A1 | 5/2018 | Bailey et al. |

FOREIGN PATENT DOCUMENTS

| | | | |
|---|---|---|---|
| WO | 2016178054 A1 | 11/2016 | |
| WO | WO-2016178054 A1 * | 11/2016 | ................ H02J 3/14 |

\* cited by examiner

ENERGY MANAGEMENT SYSTEM FOR MINIMUM FUEL CELL LOAD, AIRCRAFT HAVING AN ENERGY MANAGEMENT SYSTEM AND METHOD FOR ENSURING MINIMUM FUEL CELL LOAD

CROSS-REFERENCES TO RELATED APPLICATIONS

This application claims the benefit of the European patent application No. 19315029.9 filed on May 2, 2019, the entire disclosures of which are incorporated herein by way of reference.

FIELD OF THE INVENTION

The invention relates to an energy management system ensuring a minimum load to a fuel cell, an aircraft having such energy management system and a method for ensuring a minimum load to a fuel cell. In particular, the invention relates to an energy management system having an electric bus electrically coupling a fuel cell, an energy source, and an electrical load, wherein a controller can control the electrical load in such a manner that a minimum load to a fuel cell is ensured. The invention further relates to an aircraft having such energy management system and a method of electrically coupling the fuel cell, the energy source and the electrical load, and controlling the electrical load to ensure a minimum load to a fuel cell.

BACKGROUND OF THE INVENTION

Fuel cells become more and more important energy sources, for example on aircraft, including commercial aircrafts and unmanned aerial vehicles (UAV). For instance, as solar energy is available for most systems during a significant amount of lifetime, solar cells in combination with a regenerative fuel cell are employed to provide electric energy for consumers of the system.

However, the power regime applied to such regenerative fuel cells may wear out the fuel cell due to fluctuation of power required by the electrical loads of the system.

SUMMARY OF THE INVENTION

It is therefore an object of the invention to provide an energy management system, an aircraft and a method for managing energy that prevents wear out and increases the lifetime of a fuel cell.

According to a first exemplary aspect for understanding the present disclosure, an energy management system comprises a fuel cell configured to convert chemical energy into electric energy, at least one energy source providing electric energy, at least one electrical load, and an electric bus electrically coupled to the fuel cell, the at least one energy source, and the at least one electrical load. Thus, the fuel cell and the at least one energy source provide electric energy to the at least one electrical load. For instance, the electric bus may be connected to the fuel cell as well as the at least one energy source via electric wiring and/or may be formed by electric wiring to electrically couple the fuel cell, the at least one energy source and the at least one electrical load.

The energy management system may further comprise a controller configured to control the at least one electrical load in such a manner that a minimum load to the fuel cell is ensured. In other words, a minimum power constraint of the fuel cell is always respected. This avoids wear out of the fuel cell, since otherwise operating the fuel cell with a small load (below the minimum load) may result in a stop of the chemical reaction in the fuel cell with a possible dry out. For instance, in order to operate the fuel cell at a low power regime, only a small amount of fuel has to be provided to the fuel cell, which may not be enough to activate the fuel cell operation or (when the fuel cell already operated) may stop a proper functioning of the fuel cell. Thus, the fuel cell may be activated and deactivated alternately, which leads to wear out of the fuel cell.

The fuel cell can be operated at a high power regime. Such high power regime may mean operating the fuel cell between 50% and 70%, preferably approximately 60% fuel efficiency. The controller may be configured to control the at least one electrical load in such a manner that the bus load (all loads connected to the bus) requires electric energy corresponding to the minimum load, which may be between 45% and 60%, preferably approximately 50% fuel efficiency. Thus, the fuel cell, when activated, will be operated almost always at a power of optimal efficiency, which usually is close to the minimal power that can be provided by the fuel cell. In other words, the fuel cell can be operated at a high power regime and medium efficiency point, so that the fuel cell can be designed and dimensioned for this particular power regime and not for a broad spectrum of required power levels. Thus, the weight and size of the fuel cell can be optimized, which increases the power-to-weight ratio being optimal for aircraft, while the lifetime of the fuel cell can be increased due to less wear out of the fuel cell.

According to an implementation variant, the controller may further control the at least one electrical load in such a manner that an electric power provided by the fuel cell is constant. In other words, the electric energy consumed at the electric bus (i.e., all loads connected to the bus) during a predetermined time span is controlled by the controller in such a manner that the fuel cell can operate on a constant electric energy output level. This constant operation of the fuel cell avoids wear out of the fuel cell by avoiding several load changes. Such load changes may result from a change of energy consumption of the at least one electrical load connected to the electric bus and/or from a change of electric energy provided by the at least one energy source to the electric bus. Alternatively or additionally, the controller can control the at least one electrical load in such a manner that the electric power provided by the fuel cell is larger than a minimum power required by the at least one electrical load, and/or that the fuel cell runs at an optimal efficiency.

Thus, even if electric energy consumption at the electric bus and/or electric energy provided by the at least one energy source varies over time, the fuel cell can operate with a minimum load and/or in a constant manner and/or runs at an optimal efficiency. In other words, the electric energy consumed at the electric bus (i.e., all loads connected to the bus) is controlled by the controller in such a manner that the fuel cell can operate on at least a minimum electric energy output level and/or an electric power provided by the fuel cell (electric energy output level over a predetermined time span) is constant. This allows operation of the fuel cell with the least wear out due to optimal fuel efficiency and optimal power regime for the fuel cell.

According to a further implementation variant, the controller is configured to activate or deactivate the at least one electrical load in dependence on an electric power provided by the at least one energy source. Thus, the electric energy provided by the at least one energy source is used as a basis for the controller to activate or deactivate the at least one electrical load. The controller can control one or more of the at least one electrical load, in order to balance the electric energy provided by the at least one energy source. It is to be understood that the controller can be configured to not only activate or deactivate the one electrical load, but also to control the one electrical load by operating the electrical load at a specific power level (level of energy consumption) in dependence on an electric power provided by the at least one energy source.

Alternatively or additionally, the energy management system may comprise a plurality of electrical loads, and the controller is further configured to activate or deactivate one of the plurality of electrical loads in dependence on the electric power consumed by the remaining of the plurality of electrical loads. It is to be understood that the controller can be configured to not only activate or deactivate the one electrical load, but also to control the one electrical load by operating the electrical load at a specific power level (level of energy consumption) in dependence on the electric power consumed by the remaining of the plurality of electrical loads.

In accordance with another implementation variant, the controller is further configured to keep the bus load power of the electric bus constant over a time period, during which the fuel cell operates in a predetermined power regime. This is achieved by the controller activating, deactivating and/or operating an electrical load in such a manner that the electric energy consumed at the electric bus is constant. This allows the fuel cell to be operated in a predetermined power regime over a certain time period. For instance, the controller can determine the predetermined power regime and can control the fuel cell accordingly. Thus, the controller can set the operation mode of the fuel cell. This also reduces wear out of the fuel cell, since its operation can be kept constant when the predetermined power regime is chosen. The predetermined power regime may correspond to a particular fuel efficiency level, such as 45%, 50%, 55%, 60%, or the like.

In a further implementation variant, the at least one electrical load comprises one or more of an electrolyzer, a battery, an electric motor mechanically coupled to a drive unit, an electric heater, and a payload. An electric motor mechanically coupled to a drive unit may be present with an energy management system installed in a vehicle, such as an aircraft, a road vehicle (e.g., a car), or a floating vehicle (e.g., a boat). The drive unit may be a propeller (for an aircraft and floating vehicle) or may be a drive wheel (for a street vehicle). An electric heater may be used to heat fuel, payload or other items that have to be protected from cold. A payload as an electrical load means any electric consumer that requires electric energy, such as the controller, signaling equipment, communication equipment, surveillance equipment, an electric (servo) motor, etc. The controller can be configured to operate each of the at least one electrical load in such a manner that a minimum load to the fuel cell is ensured, and/or that the fuel cell outputs a constant electric power, and/or that the electric power provided by the fuel cell is larger than a minimal power required by the at least one electrical load, and/or that the fuel cell runs at an optimal efficiency.

The fuel cell with the electrolyzer may form a regenerative fuel cell, and the electrolyzer is capable of breaking down a chemical into fuel and a remainder, such as breaking down water into hydrogen and oxygen. In this regard, the controller can be configured to operate the electrolyzer in such a manner that a minimum load to the fuel cell is ensured, and/or that the fuel cell outputs a constant electric power, and/or that the electric power provided by the fuel cell is larger than a minimal power required by the at least one electrical load, and/or that the fuel cell runs at an optimal efficiency. In other words, at any given time the electrolyzer generates fuel (e.g., hydrogen) in an amount corresponding to the electric energy available at the electric bus (provided by the fuel cell and the at least one energy source connected to the electric bus) less the electric energy consumed by all electrical loads besides the electrolyzer. Otherwise, the electric energy is to be wasted by an electrical heater not having any particular heating function or similar less useful consumer of electric energy. Thus, instead of wasting electric energy due to varying electric energy supply and/or varying electric energy consumption, while trying to operate the fuel cell at or above the minimum load (close to a minimal power output of the fuel cell), the superfluous electric energy is stored in form of fuel to operate the fuel cell, e.g., in form of reactant gases.

According to a further variant, the energy management system may further comprise a fuel tank fluidly coupled to the electrolyzer and adapted to store fuel generated by the electrolyzer and to provide the stored fuel to the fuel cell. The fuel tank may be part of the regenerative fuel cell and/or of the electrolyzer. Furthermore, the fuel generated by the electrolyzer may be compressed before being stored in the fuel tank, for example, via a pump or compressor. In a specific variant of the energy management system, the regenerative fuel cell, electrolyzer and fuel tank form a unit, i.e., are mounted together to form a compact structural unit.

If the at least one electrical load comprises an electric motor mechanically coupled to a drive unit of a vehicle, the controller may be configured to operate the electric motor in such a manner that a minimum load to the fuel cell is ensured, and/or that the fuel cell outputs a constant electric power, and/or that the electric power provided by the fuel cell is larger than a minimal power required by the at least one electrical load, and/or that the fuel cell runs at an optimal efficiency. For instance, the controller may control the electric motor in such a manner that the vehicle performs a climb maneuver and/or accelerates, for example, by increasing the revolution speed of the motor and, hence, the drive unit. The drive unit can be a propeller or drive wheel, which revolution speed proportionally depends on the revolution speed of the motor. Thus, instead of wasting electric energy due to varying electric energy supply and/or varying electric energy consumption, while trying to operate the fuel cell at or above the minimum load (close to a minimal power output of the fuel cell), the superfluous electric energy is stored in form of mechanical potential energy and/or kinetic energy of the vehicle in which the energy management system is integrated.

According to a further implementation variant, the at least one electrical load may comprise a battery. The controller can then be configured to operate the battery in such a manner that a minimum load to the fuel cell is ensured, and/or that the fuel cell outputs a constant electric power, and/or that the electric power provided by the fuel cell is larger than a minimal power required by the at least one electrical load, and/or that the fuel cell runs at an optimal efficiency. In other words, the controller can charge the battery, in order to store electric energy, instead of wasting electric energy due to varying electric energy supply and/or varying electric energy consumption, while trying to operate the fuel cell at or above the minimum load (close to a minimal power output of the fuel cell).

In another implementation variant the at least one energy source comprises one or more of at least one solar panel configured to convert light into electric energy, a battery, and an electric motor mechanically coupled to a drive unit and configured to operate as a generator during deceleration or descending periods. Thus, the at least one energy source provide electric energy to all energy consumers of the energy management system via the electric bus. The electric energy generated by the at least one energy source may vary over time, while the electric energy consumed by the at least one electrical load may be constant (or will also vary over time independently from the energy provided). Thus, the controller has to control the at least one electrical load to compensate for such changes of available/consumed electric energy.

For instance, the electric energy generated by the at least one solar panel varies, for example, due to an angle of the sunlight incident on the at least one solar panel, due to the at least one solar panel being, at least partially, in a shadow and/or due to sunrise or sunset. The battery may provide electric energy at a certain level, which may decrease, if the battery runs low. The electric motor may generate electric energy during deceleration or descending periods of a vehicle in which the energy management system is implemented. For example, if the electric motor and drive unit (such as a propeller or drive wheel) are fixedly mechanically coupled, i.e., without a clutch or similar separating unit, any deceleration or descending of the vehicle will cause the generation of electric energy.

Another implementation variant of the energy management system provides at least one light sensor configured to detect the intensity of sunlight incident on the at least one solar panel. Such light sensor can be disposed anywhere on a surface of the vehicle, and preferably on a surface of the at least one solar panel. Moreover, each of the at least one solar panel may be equipped with a respective light sensor. The controller can then be configured to control the at least one electrical load in dependence on the detected intensity of sunlight. For instance, the controller can be connected to the at least one light sensor, in order to receive a signal and/or digital data representing the intensity of sunlight incident on the light sensor.

The energy management system may further be operable in such a manner that especially during transition phases of the sunlight, i.e., sunset or sunrise, the fuel cell is operated at or above the minimum load of the fuel cell, while superfluous electric energy is stored as fuel generated by the electrolyzer, and/or as potential or kinetic energy achieved via the motor and drive unit, and/or as electric energy stored in the battery. In addition, superfluous electric energy may be used by an electric heater or a payload, which may be operated specifically at times where superfluous electric energy is available (e.g., under the control of the controller). The transition phases of the sunlight usually require constant or stepwise adjustment of the electric power generated by the fuel cell, corresponding to the amount of electric energy produced less or more by the at least one solar panel. Such conventional change of the output level of the fuel cell twice a day, however, leads to wear out of the fuel cell and significantly reduces the lifetime of the fuel cell. Thus, operating the fuel cell at or above a minimum load, according to the first aspect or one of its variants, allows for employing a fuel cell in a vehicle having a good power-to-weight ratio and increases the lifetime of the fuel cell.

It is to be understood that the fuel cell may be switched-off entirely, for example, at times of bright sunlight, i.e., when the at least one solar panel produces enough energy for all electrical loads or more.

In accordance with a further implementation variant, the energy management system comprises a plurality of fuel cells configured to convert chemical energy into electric energy. Each of the previous implementation variants may be applied to each of the plurality of fuel cells. For instance, if more electric energy is required, more than one fuel cell will be activated (e.g., under the control of the controller).

Additionally or alternatively, the (single) fuel cell or one or more of the plurality of fuel cells is a multi-sector fuel cell, wherein each sector of the fuel cell can be operated individually. For instance, the active area of the fuel cell, where reactant gases can be brought together, maybe divided in sections (sectors) fluidly separated from one another. Thus, providing reactant gases only to one or more of these sectors allows operation of each sector of the fuel cell individually.

The controller can be configured to control each of the plurality of fuel cells and/or each of the sectors of the one or more fuel cells individually in such a manner that a minimum load to each of the plurality of fuel cells and/or fuel cell sectors is ensured, and/or that the plurality of fuel cells and/or one or more of the fuel cell sectors output a constant electric power, and/or that the electric power provided by the plurality of fuel cells and/or one or more of the fuel cell sectors is larger than a minimal power required by the at least one electrical load, and/or that the plurality of fuel cells and/or one or more of the fuel cell sectors run at an optimal efficiency. In other words, the controller is capable of providing the required energy for the electric bus, while operating only as many fuel cells and/or as many sectors of one or more fuel cells as necessary, but at an optimal power regime of the fuel cell and/or sector.

It is to be understood that the controller can further operate one or more fuel cells and/or one or more sectors at different power levels. This allows an optimum efficiency of each fuel cell and/or sector, while achieving a power output larger than the minimum required power for all electrical consumers at the electric bus.

According to a second exemplary aspect for understanding the present disclosure, an aircraft comprises an energy management system according to the first aspect or one of its variants.

For example, the aircraft may be a high-altitude platform station or high altitude pseudo satellite. Such type of aircraft is intended to stay in a flight mode for several days, weeks or even months. Here it is important that the fuel cell and other components can operate over a long time period, i.e., have a long lifetime. Thus, operating the fuel cell at or above a minimum load to the fuel cell or at a constant electric power regime, and/or to provide electric power from the fuel cell to be larger than a minimal power required by the at least one electrical load, and/or running the fuel cell at an optimal efficiency, increases the lifetime of the fuel cell and reduces the risk of failure.

According to a third exemplary aspect for understanding the present disclosure, a method for managing energy in a system having a fuel cell, at least one energy source, and at least one electrical load comprises the steps of: electrically coupling the fuel cell, the at least one energy source, and the at least one electrical load by an electric bus, and controlling the at least one electrical load in such a manner that a minimum load to the fuel cell is ensured.

Alternatively or additionally, the at least one electrical load is controlled in such a manner that the fuel cell outputs a constant electric power. Also alternatively or additionally, the at least one electrical load is controlled in such a manner that the electric power provided by the fuel cell is larger than a minimal power required by the at least one electrical load, and/or that the fuel cell runs at an optimal efficiency In a variant of the method, the at least one electrical load can comprise an electrolyzer, and the method comprises the step of: operating the electrolyzer in such a manner that the minimum load to the fuel cell is ensured, and/or that the fuel cell outputs a constant electric power, and/or that the electric power provided by the fuel cell is larger than a minimal power required by the at least one electrical load, and/or that the fuel cell runs at an optimal efficiency.

Alternatively or additionally, the at least one electrical load can comprise an electric motor mechanically coupled to a drive unit of a vehicle, such as a propeller or drive wheel, and wherein the method comprises the step of: operating the electric motor in such a manner that the minimum load to the fuel cell is ensured and/or that the fuel cell outputs a constant electric power, and/or that the electric power provided by the fuel cell is larger than a minimal power required by the at least one electrical load, and/or that the fuel cell runs at an optimal efficiency. Optionally, the method may further comprise performing a climb and/or acceleration maneuver with the vehicle comprising the system.

According to a further variant, the method may further comprise the step of operating the electric motor as a generator during deceleration or descending periods of the vehicle.

According to another variant, the method may further comprise the step of detecting an intensity of (sun-) light incident on the at least one solar panel by at least one light sensor. The controlling of the at least one electrical load can then comprise operating the at least one electrical load in dependence on the detected intensity of (sun-) light.

The present disclosure is not restricted to the aspects and variants in the described form and order. Specifically, the description of aspects is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

Preferred embodiments of the invention are now explained in greater detail with reference to the enclosed schematic drawings, in which FIG. 1 schematically illustrates an energy management system.

DETAILED DESCRIPTION OF THE PREFERRED EMBODIMENTS

Figure 1:
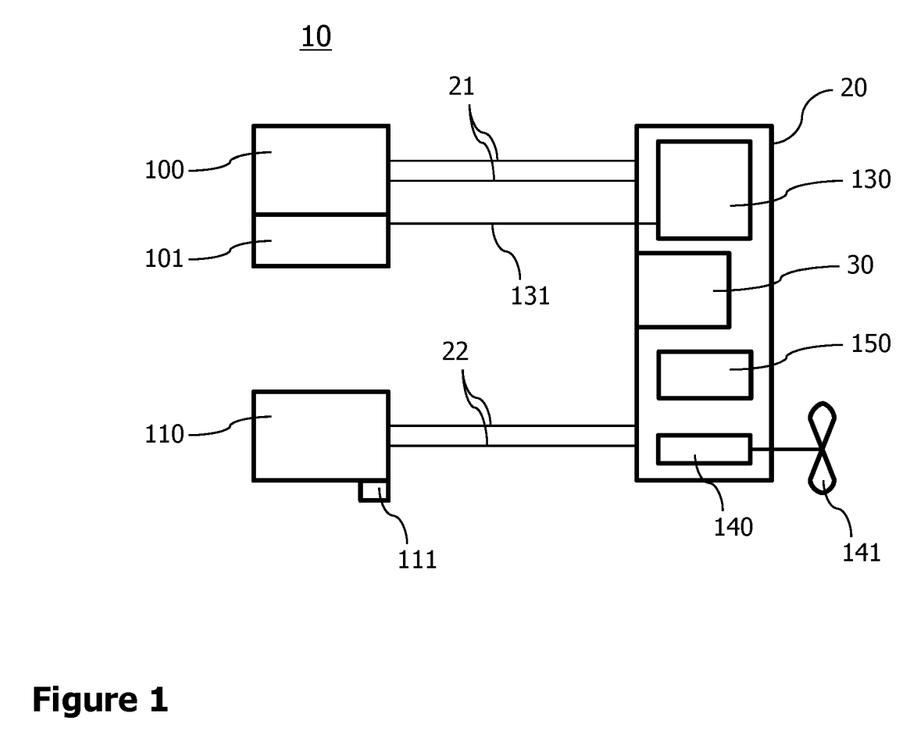

FIG. 1 schematically illustrates an energy management system 10 that includes a fuel cell 100 configured to convert chemical energy into electric energy. For example, the fuel cell 100 may be operated with reactant gases, such as hydrogen and oxygen. The reactant gases can be stored in a fuel tank 101, which may comprise more than one chamber, in order to store at least two different reactant gases separated from one another. The fuel tank 101 is illustrated as forming a structural unit with the fuel cell 100. However, the fuel tank 101 can be separate from the fuel cell 100 and connected to the fuel cell 100 via one or more ducts (not illustrated) for the reactant gases.

The fuel cell 100 may be configured as a regenerative fuel cell 100 that is structured so that it recycles (regenerates) the exhaust gas or liquid (for example, water). To do so, the energy management system 10 further comprises an electrolyzer 130 that is configured to convert an ionic substance into fuel (e.g., reactant gases for the fuel cell 100) by applying a direct current (electric energy) to the ionic substance. The electrolyzer 130 is fluidly coupled to the fuel tank 101 via one or more associated ducts 131. Although only one duct 131 is illustrated in FIG. 1, it is to be understood that a plurality of ducts 131 may connect the fuel tank 101 with the electrolyzer 130. Furthermore, although FIG. 1 illustrates the electrolyzer 130 as a separate component, the electrolyzer 130 may form a structural unit with the fuel cell 100 and/or the fuel tank 101, so that the duct 131 may be omitted or at least can be kept very short.

The electric energy generated by the fuel cell 100 is provided via associated electrical wiring 21 to an electric bus 20. The electric bus 20 is configured to provide electric energy to at least one electrical load 130, 140, 150 schematically illustrated in FIG. 1. The energy management system 10 may further comprise at least one energy source 110, such as an electric motor 140, a battery 150, and/or a solar panel 110 configured to convert light into electric energy. The at least one energy source 110 is also electrically connected to the electric bus 20 via associated electrical wiring 22. Thus, the electric bus 20 electrically couples the fuel cell 100, the at least one energy source 110 and the at least one electrical load 130, 140, 150.

A controller 30 of the energy management system 10 is configured to control the at least one electrical load 130, 140, 150 in such a manner that a minimum load to the fuel cell 100 is ensured. In other words, the controller 30 controls the at least one electrical load 130, 140, 150 in such a manner that the electric power consumed at the electric bus 20 does not fall below the minimum load of the fuel cell 100. This ensures that the fuel cell 100 can be operated at a predetermined power regime, such as an optimum and/or high-power regime, so that wear out of the fuel cell 100 is avoided.

The controller 30 may further be configured to control the at least one electrical load 130, 140, 150 in such a manner that an electric power provided by the fuel cell 100 is constant. In other words, the electric energy consumption of the at least one electrical load 130, 140, 150 is controlled in such a manner that the fuel cell 100 can operate in a constant mode and produces electric power in a constant manner. Alternatively or additionally, the controller 30 may further be configured to control the at least one electrical load 130, 140, 150 in such a manner that the electric power provided by the fuel cell 100 is larger than a minimum power required by the at least one electrical load 130, 140, 150, and/or that the fuel cell 100 runs at an optimal efficiency.

For instance, the controller 30 can activate or deactivate the at least one electrical load 130, 140, 150 or can operate the at least one electrical load 130, 140, 150 in a mode, where the at least one electrical load 130, 140, 150 consumes a specific electric power. The controller 30 may activate, deactivate or operate the at least one electrical load 130, 140, 150 in a specific energy consuming mode in dependence on an electric power provided by the at least one energy source 110 and/or in dependence on the electric power consumed by the remaining electrical loads 130, 140, 150. In this way, the controller 30 can compensate for variations of the electric energy running through the electric bus 20, such as varying electric energy provided by the at least one energy source 110 and/or varying consumption of electric energy by the at least one electrical load 130, 140, 150.

For instance, if the electric energy available at the electric bus 20 increases or decreases due to variations, the electrolyzer 130 may increase or decrease its consumption of electric energy, respectively, i.e., may generate more or less reactant gases for the fuel cell 100, respectively, so that the consumption of electric energy of the electrolyzer 130 compensates for the variations. Thus, excess electric energy available at the electric bus 20 can be stored chemically. It is to be noted that electric energy produced by the fuel cell 100 is (at least partially) used to operate the electrolyzer 130. Although this is technically unusual, the lifetime of the fuel cell 100 can be increased significantly due to less wear out. If in, for example, an aircraft 1 comprising such energy management system 10 is a high-altitude platform station or high altitude pseudo satellite, a long lifetime of the fuel cell 100 is important, as the aircraft 1 may stay in a flight mode for several days, weeks or even months.

The energy management system 10 may further comprise an electric motor 140, being one of the at least one electrical load 130, 140, 150. The electric motor 140 is mechanically coupled to a drive unit 141, such as a drive wheel or a propeller 141 of a vehicle exemplarily illustrated in FIG. 1. For example, drive unit 141 is directly mounted on an output shaft of the electric motor 140 or via a gear transmission (not illustrated). The controller 30 can operate the electric motor 140 in such a manner that a minimum load to the fuel cell 100 is ensured and/or that the fuel cell 100 outputs a constant electric power. For instance, if the electric energy available at the electric bus 20 increases or decreases due to variations, the rotational speed of the electric motor 140 is increased and decreased, respectively, so that the consumption of electric energy of the electric motor 140 compensates for the variations. When increasing the rotational speed of the electric motor 140, the drive unit 141 can also be operated faster, and the vehicle, such as an aircraft 1 (FIG. 3), can perform a climb and/or acceleration maneuver, so that potential and/or kinetic energy are stored in the vehicle 1, respectively.

Likewise, electric energy can be stored in a battery 150, being a further example of the at least one electrical load 130, 140, 150. The controller 30 may be configured to charge the battery 150, in order to store excess electric energy available at the electric bus 20. Thus, a minimum load to the fuel cell 100 is ensured and/or the fuel cell 100 can output a constant electric power. A further possible electrical load is an electric heater (not exemplarily illustrated besides battery 150) or a payload of the vehicle 1.

The battery 150 as well as the electric motor 140 may also function as an energy source, e.g., the electric motor 140 may be operated as a generator during deceleration or descending periods of the vehicle.

In order to react faster on variations of the electric energy produced by the at least one energy source 110, particularly at least one solar panel 110, at least one light sensor 111 may be included in the energy management system 10. The at least one light sensor 111 can detect the intensity of (sun-) light incident on the at least one solar panel 110, so that the controller can control the at least one electrical load 130, 140, 150 in dependence on the detected intensity of (sun-) light.

Figure 2:
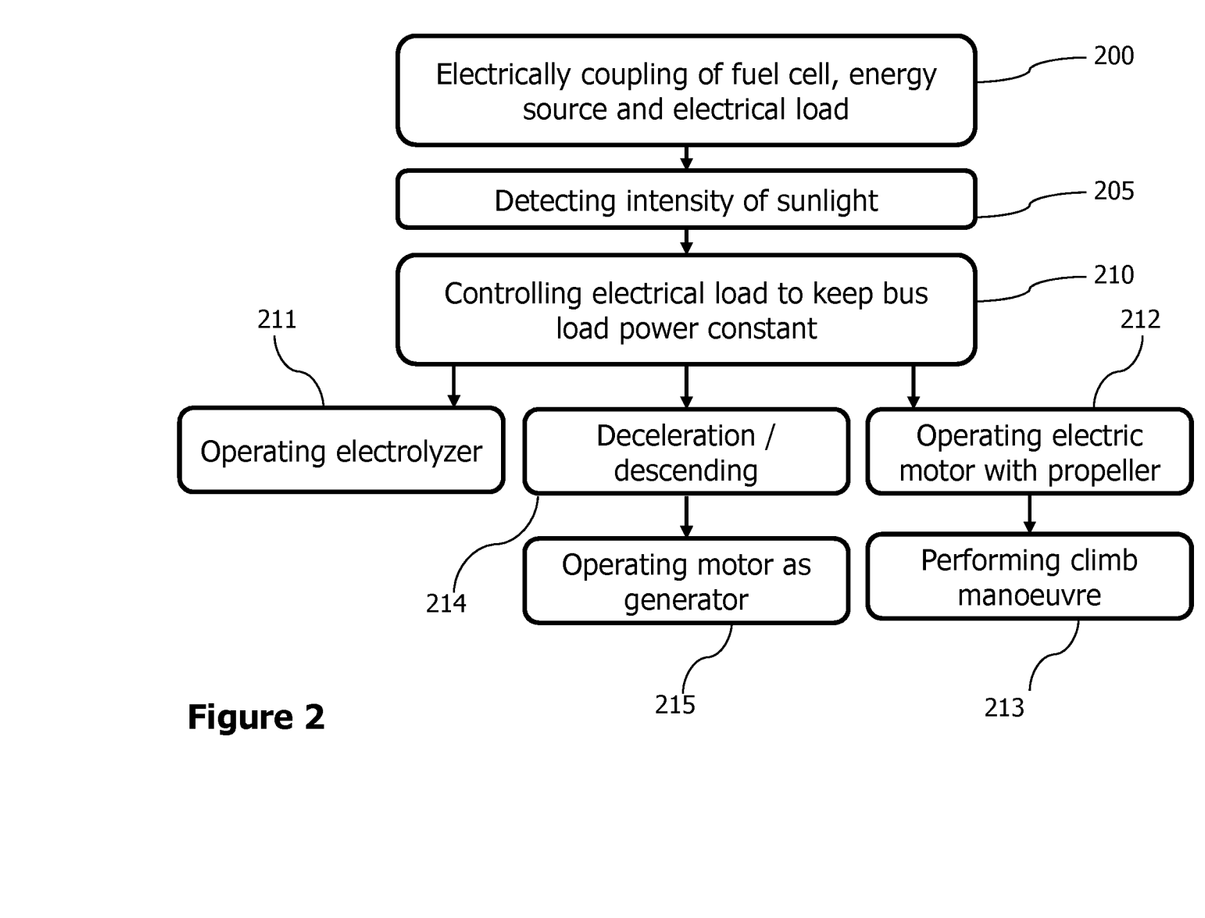
FIG. 2 schematically illustrates a flow diagram of a method for managing energy in a vehicle.

FIG. 2 schematically illustrates a flow diagram of a method for managing energy in a system, such as an aircraft 1. The method includes the step 200 of electrically coupling a fuel cell 100, at least one energy source 110, and at least one electrical load 130, 140, 150 by an electric bus 20. Thus, the electric energy produced by the fuel cell 100 and the at least one energy source 110 can be delivered to the at least one electrical load 130, 140, 150. This distribution or allocation of electric energy to the at least one electrical load 130, 140, 150 may take place during a step 210 of controlling the at least one electrical load 130, 140, 150 in such a manner that a minimum load to the fuel cell 100 is ensured, and/or that the fuel cell 100 outputs a constant electric power, and/or that the electric power provided by the fuel cell 100 is larger than a minimal power required by the at least one electrical load 130, 140, 150, and/or that the fuel cell 100 runs at an optimal efficiency.

The controlling 210 may be made dependent on step 205, i.e., detecting the intensity of (sun-) light incident on the at least one solar panel 110. For instance, the intensity of (sun-) light may be measured via one or more light sensors 111, which are connected to the controller 30, which can control the at least one electrical load 130, 140, 150 based on a signal and/or data received from the light sensor(s) 111. In addition, the controlling 210 may be made dependent on the use of another of the at least one electrical load 130, 140, 150. For instance, an electric heater 150 may be used at certain times (e.g., at night or cold weather conditions), and a payload 150 may also be used at certain times. If the user time of the electric heater 150 and payload 150 are known in advance, the controlling 210 may take into account such future consumption of electric energy.

Controlling 210 of the at least one electrical load 130, 140, 150 may include operating an electrolyzer 130 in such a manner that a minimum load to the fuel cell 100 is ensured and/or that the fuel cell 100 outputs a constant electric power. Alternatively or additionally, controlling 210 may include operating an electric motor 140 with a propeller 141 in such a manner that the minimum load to the fuel cell 100 is ensured and/or that the fuel cell 100 outputs a constant electric power. This may include performing a climb and/or acceleration maneuver of the vehicle 1 in step 213. Likewise, the electrolyzer 130 and/or electric motor 140 may be operated in such a manner that the electric power provided by the fuel cell 100 is larger than a minimal power required by the at least one electrical load 130, 140, 150, and/or that the fuel cell 100 runs at an optimal efficiency.

The electric motor 140 may also function as an energy source, so that the method further comprises performing in step 214 a deceleration or descending maneuver of the vehicle 1 and operating in step 215 the electric motor 140 as a generator. Thus, kinetic and/or potential energy is converted to electric energy.

Figure 3:
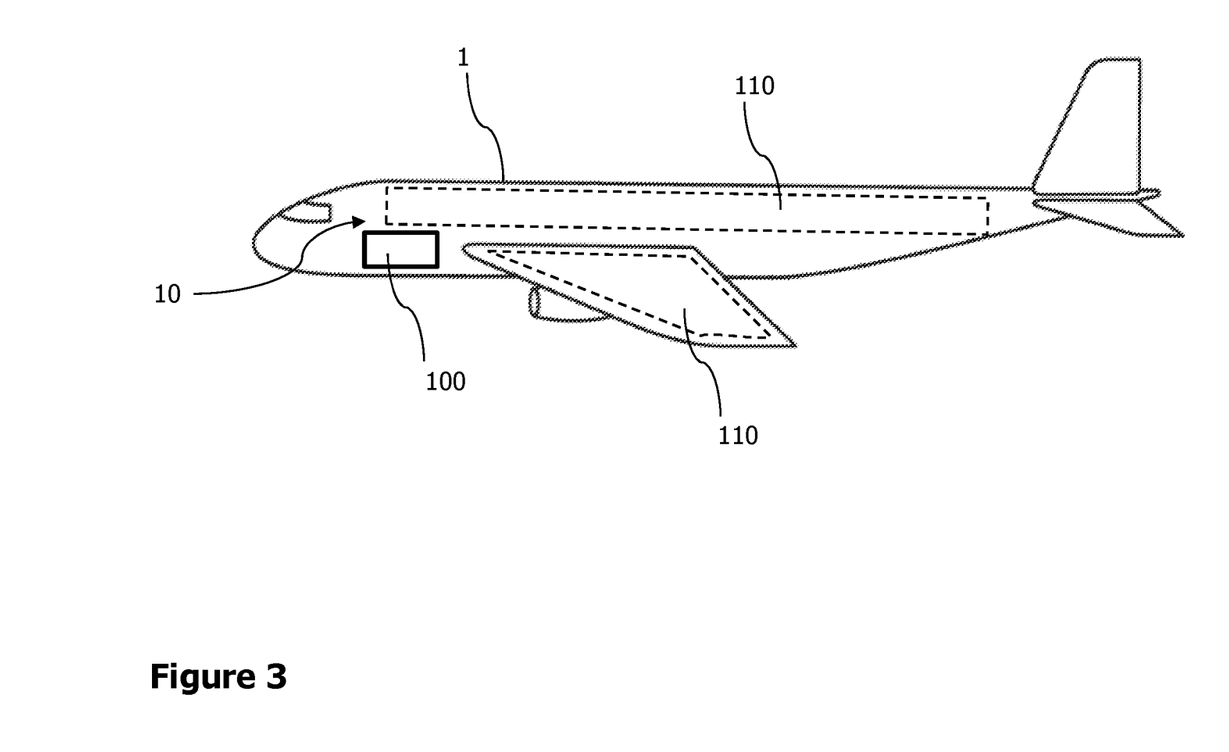
FIG. 3 schematically illustrates an aircraft.

FIG. 3 schematically illustrates an aircraft 1 (as one possible vehicle 1) comprising an energy management system 10 that includes at least one energy source 110. Such energy source may be at least one solar panel 110 provided on any surface (outer surface) of the aircraft 1, so that light (sunlight) can incident on the solar panel 110. In addition, the aircraft 1 may further comprise a fuel cell 100, in order to provide electric energy due to a chemical process. For instance, the fuel cell 100 may produce electric energy at a time when the solar panel(s) 110 do(es) not provide enough electric energy for all consumers, such as during nighttime. On the other hand, if enough electric energy is produced by the at least one solar panel 110, the fuel cell 100 may be completely switched off.

In phases of transition between nighttime and daytime (e.g., sunrise and sunset) the energy management system 10 may control at least one electrical load 130, 140, 150 in such a manner, that that a minimum load to the fuel cell 100 is ensured, and/or that the fuel cell 100 outputs a constant electric power, and/or that the electric power provided by the fuel cell 100 is larger than a minimal power required by the at least one electrical load 130, 140, 150, and/or that the fuel cell 100 runs at an optimal efficiency. Thus, especially during a time of varying electric energy provided by the at least one solar panel 110, the fuel cell 100 is not forced to provide a correspondingly varying amount of electric power.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An energy management system, comprising:
   a fuel cell configured to convert chemical energy into electric energy;
   at least one energy source providing electric energy;
   at least one electrical load;
   an electric bus electrically coupled to the fuel cell, the at least one energy source, and the at least one electrical load;
   a controller configured to control the at least one electrical load such that a minimum load to the fuel cell is ensured;
   an electrolyzer; and
   a fuel tank fluidly coupled to the electrolyzer and configured to store fuel generated by the electrolyzer and to provide stored fuel to the fuel cell.

2. The energy management system according to claim 1, wherein the controller is further configured to control the at least one electrical load such that at least one of:
   an electric power provided by the fuel cell is constant,
   the electric power provided by the fuel cell is larger than a minimum power required by the at least one electrical load, or
   the fuel cell runs at an optimal efficiency.

3. The energy management system according to claim 1, wherein at least one of:
   the controller is configured to activate or deactivate the at least one electrical load in dependence on an electric power provided by the at least one energy source, or
   the energy management system comprises a plurality of electrical loads, and the controller is further configured to activate or deactivate a subset of the plurality of electrical loads in dependence on the electric power consumed by non-subset electrical loads of the plurality of electrical loads.

4. The energy management system according to claim 1, wherein the controller is further configured to keep an electric power provided by the fuel cell constant over a time period, during which the fuel cell operates in a predetermined power regime, and
   wherein the controller is configured to determine the predetermined power regime and controls the fuel cell accordingly.

5. The energy management system according to claim 1, wherein the at least one electrical load comprises one or more of:
   a battery;
   an electric motor mechanically coupled to a drive unit;
   an electric heater; and
   a payload,
   wherein the controller is configured to operate each of the at least one electrical load such that at least one of:
      the minimum load to the fuel cell is ensured,
      the fuel cell outputs a constant electric power,
      the electric power provided by the fuel cell is larger than a minimal power required by the at least one electrical load, or
      the fuel cell runs at an optimal efficiency.

6. The energy management system according to claim 5, wherein the controller is further configured to operate the electric motor in such a manner that the drive unit performs at least one of a climb or acceleration maneuver.

7. The energy management system according to claim 1, wherein the at least one energy source comprises one or more of:
   at least one solar panel configured to convert light into electric energy;
   a battery; or
   an electric motor mechanically coupled to a propeller and configured to operate as a generator during deceleration or descending periods.

8. The energy management system according to claim 1, comprising:
   a plurality of fuel cells configured to convert chemical energy into electric energy,
   wherein one or more of the plurality of fuel cells is a multi-sector fuel cell,
   wherein each sector of the fuel cell can be operated individually, and
   wherein the controller is configured to control at least one of each of the plurality of fuel cells or each of the sectors of the one or more fuel cells such that at least one of:
      the minimum load to at least one of each of the plurality of fuel cells or fuel cell sectors is ensured,
      at least one of the plurality of fuel cells or one or more of the fuel cell sectors output a constant electric power,
      the electric power provided by at least one of the plurality of fuel cells or one or more of the fuel cell sectors is larger than a minimal power required by the at least one electrical load, or
      at least one of the plurality of fuel cells or one or more of the fuel cell sectors run at an optimal efficiency.

9. An aircraft comprising an energy management system according to claim 1.

10. The aircraft according to claim 9, wherein the aircraft is a high-altitude platform station or high altitude pseudo satellite.

11. A method for managing energy in a system having a fuel cell, at least one energy source, and at least one electrical load, wherein the method comprises:
   electrically coupling the fuel cell, the at least one energy source, and the at least one electrical load by an electric bus; and
   controlling the at least one electrical load such that at least one of:
      a minimum load to the fuel cell is ensured,
      the fuel cell outputs a constant electric power,
      the electric power provided by the fuel cell is larger than a minimal power required by the at least one electrical load, or
      the fuel cell runs at an optimal efficiency, wherein the system is an aircraft, wherein the at least one electrical load comprises an electric motor mechanically coupled to a propeller, and wherein the method further comprises:
  operating the electric motor such that at least one of:
    the minimum load to the fuel cell is ensured,
    the fuel cell outputs a constant electric power,
    the electric power provided by the fuel cell is larger than a minimal power required by the at least one electrical load, or
    the fuel cell runs at an optimal efficiency; and
  performing at least one of a climb or acceleration maneuver with the aircraft.

12. The method according to claim 11, wherein the at least one electrical load comprises an electrolyzer, and wherein the method comprises:
  operating the electrolyzer such that at least one of:
    the minimum load to the fuel cell is ensured,
    the fuel cell outputs a constant electric power,
    the electric power provided by the fuel cell is larger than a minimal power required by the at least one electrical load, or
    the fuel cell runs at an optimal efficiency.

13. The method according to claim 11, further comprising:
  performing a deceleration or descending maneuver of the aircraft; and
  operating the electric motor as a generator during the deceleration or descending maneuver of the aircraft.

14. An energy management system, comprising:
  a fuel cell configured to convert chemical energy into electric energy;
  at least one energy source providing electric energy;
  at least one electrical load;
  an electric bus electrically coupled to the fuel cell, the at least one energy source, and the at least one electrical load;
  a controller configured to control the at least one electrical load such that a minimum load to the fuel cell is ensured;
  an electric motor mechanically coupled to a drive unit;
  wherein the controller is further configured to operate the electric motor in such a manner that the drive unit performs at least one of a climb or acceleration maneuver.

* * * * *